Patented July 3, 1945

2,379,464

UNITED STATES PATENT OFFICE 2,379,464

SYNTHETIC RUBBER COMPOSITIONS

Herman R. Thies, Kent, Ohio, assignor to Wingfoot Corporation, Akron, Ohio, a corporation of Delaware No Drawing. Application September 5, 1941, Serial No. 409,656

8 Claims. (Cl. 260—5)

This invention relates to rubber compositions containing synthetic rubber and having a lower plasticity and greater resistance to abrasion than unmodified synthetic rubbers. More particularly, the invention relates to combinations of a synthetic rubber and cyclized rubber in which the properties referred to and others are modified by the presence of the cyclized rubber.

Certain synthetic rubbers are much used for special purposes where their properties render them more useful than natural rubber. The particular synthetic rubbers contemplated are chloro butadiene polymers, organic polysulfide plastics, isobutylene polymers, and butadiene-acrylonitrile copolymers. These materials can be used where natural rubber is not suitable, as in installations where oil resistance is necessary. However, it is often found that the synthetic rubber is too plastic in the uncured state to be handled properly in milling and tubing and a greater stiffness or lesser plasticity of the synthetic rubber would be desirable. Therefore, the present invention aims to provide improved synthetic rubber having greater stiffness or hardness than the untreated rubber so that the materials will hold their shape and be extrudable through conventional rubber machinery. Another object of the invention is to provide synthetic rubber from which a finished product can be made which is stiff and hard and which resists bending. Still another object of the invention is to provide synthetic rubber can be compounded into a hard impact-resisting stock subject to minimum deformation under impact.

The synthetic rubber is modified in the direction stated by the addition of cyclized rubber in varying amounts, cyclized rubber being a product resulting from the treatment of natural rubber with a reagent, such as tin tetrachloride and the like, to alter the arrangement of the rubber molecule with respect to unsaturation, without altering the chemical composition. The cyclized rubber may be mixed with the synthetic rubber on a rubber mill or other apparatus in proportions ranging from 1% of the composition up to 75-80% of the composition but, preferably, from 20 to 60% is used. Preferably, the synthetic rubber is gradually added to the cyclized rubber rather than the reverse procedure. Good results are normally obtained when each rubber is present to the extent of at least 25% of the total rubber. The composition is then incorporated with vulcanizing ingredients and the stock, thus formed, is vulcanized.

One such stock was made up as a test formula and had the following composition:

| | Parts |
|---|---|
| Rubber composition | 100 |
| Zinc oxide | 5 |
| Stearic acid | 1.5 |
| Lauric acid | 1.5 |
| Zinc dimethyl dithiocarbamate | 0.2 |
| Mercaptobenzothiazole | 1.5 |
| Di-beta-naphthyl-paraphenylene diamine | 2.0 |
| Sulfur | 1.5 |

The stock was then cured for one to ten minutes at a temperature of 300° F. and the tensile strength of the best cure was determined. The following results were recorded:

| Compound | Cyclized and synthetic rubber tensile strength per square inch | | |
|---|---|---|---|
| | 75% cyc. 25% syn. | 50% cyc. 50% syn. | 25% cyc. 75% syn. |
| | Pounds | Pounds | Pounds |
| Chlorobutadiene | 4,800 | 2,200 | 1,600 |
| Organic polysulfide | 3,900 | 2,300 | 1,900 |
| Polymerized isobutylene | 5,000 | 1,100 | 800 |
| Butadiene-acrylonitrile copolymer | 5,000 | 2,200 | 1,100 |

It will be noted that the tensile strength progressively increased in each instance as the proportion of cyclized rubber was raised from 25% to 75%. A product having a tensile strength of at least 1000 pounds per square inch in the cured condition is desirable, although not necessary, and best results are probably attained when the tensile strength is in the neighborhood of 2200 pounds per square inch, more or less.

Additional tests on the foregoing samples disclose that the Durometer hardness, as determined on a type D Shore hard rubber Durometer was raised from approximately 20 for 100% synthetic rubber stocks to approximately 30 for a stock containing 25% of cyclized rubber and to approximately 80 for stocks containing 75% of cyclized rubber. Also, abrasion was determined on a Grasselli abrasion machine and it was found that the values obtained dropped from about 1800 cc. or more per horse power hour for 100% synthetic rubber to less than 500 cc. per hour for the hardest cyclized rubber composition. The shear resistance was measured by cutting sheets of the cured compositions with a pair of shears and here, again, there was an improvement in the stock. For example, a butadiene-acrylonitrile interpolymer containing no cyclized rubber showed a pulling shear on the blades of the shears of approximately 500 grams, whereas the stock containing 50% of cyclized rubber required a pull of about 3000 grams and the stock containing 75% of cyclized rubber, a pull of about 6000 grams.

While the foregoing tests were carried out on cured stocks, a parallel increase in stiffness of the raw stock was observed. This is important since it aids in the fabrication of uncured articles by giving the necessary rigidity in the tubing and shaping of such articles.

The cyclized rubber employed in the invention may be prepared by heating rubber in the presence of a condensing agent, such as tin tetra chloride or chlorostannic acid. Such products are described in U. S. Patents 1,797,188, 1,846,247 and 2,052,391. Cyclized rubber as described in these patents is the product resulting from the reaction of rubber with an acid, the negative portion of which acid includes tin and chlorine, the reaction product of rubber with a hydrated halogen acid of tin or with a halide of an amphoteric metal. Examples of other reagents which produce cyclized rubber from natural rubber are stannic chloride, ferric chloride, titanium tetrachloride, and chromic chloride. Other known methods and reagents may also be used to cyclize the rubber.

In producing the cyclized rubber, the following procedure among others, may be employed: A rubber cement is diluted with additional solvent and heated for about 2 hours to a temperature of 160° F. Thereafter, the temperature is raised to about 180° F. and 37% hydrochloric acid is added to the extent of about 2.8% of the rubber present. Shortly after, a 50% solution of stannic chloride in benzene is added in amount about 7% of the rubber. Water of condensation is progressively withdrawn and the viscosity of the cement is followed until the desired value has been achieved. Thereupon, the reaction is arrested by the addition of cold water directly to the mixture, the cyclized rubber being obtained in solid form. Other methods of preparation, as by heating rubber with phenols or cresols may also be followed, the foregoing method being given only for the purpose of illustrating the preparation and properties of cyclized rubber.

It will be apparent that the degree of stiffness or hardness imparted to the synthetic rubber is controllable by the amount of cyclized rubber which is employed and this in turn will depend upon the properties required in the article which is to be made from the composition. Stocks prepared in accordance with the principles of the invention may be used for wire insulation, where the stock must be sufficiently stiff to be easily handled on the wire, and in the molding of various products, such as bicycle seats, protective helmets, e. g., football helmets, miners' helmets and protective helmets for use inside of combat tanks. Other uses are in the manufacture of heels and soles and for all articles where a hard, tough synthetic rubber stock is required.

While there have been described above the preferred embodiments of the invention, it will be apparent to those skilled in the art that various modifications and changes may be made therein without departing from the spirit of the invention or from the scope of the appended claims.

I claim:

1. A composition comprising a rubbery butadiene-acrylonitrile copolymer and cyclized rubber, the cyclized rubber being present in an amount between about 25% and about 75% of the sum of the two ingredients.

2. A composition comprising a rubbery butadiene-acrylonitrile copolymer and rubber cyclized in the presence of an amphoteric metal halide, the cyclized rubber being present in an amount between about 25% and about 75% of the sum of the two rubber ingredients.

3. A composition comprising a rubbery butadiene-acrylonitrile copolymer and rubber cyclized in the presence of tin tetrachloride, the cyclized rubber being present in an amount between about 25% and about 75% of the sum of the two rubber ingredients.

4. A composition comprising a rubbery butadiene-acrylonitrile copolymer and rubber cyclized in the presence of an acid, the negative portion of which acid includes tin and chlorine, the cyclized rubber being present in an amount between about 25% and about 75% of the sum of the two rubber ingredients.

5. A composition comprising a rubbery butadiene-acrylonitrile copolymer and rubber cyclized in the presence of chlorostannic acid, the cyclized rubber being present in an amount between about 25% and about 75% of the sum of the two rubber ingredients.

6. A composition comprising a rubbery butadiene-acrylonitrile copolymer and rubber cyclized in the presence of an hydrated halogen acid of tin, the cyclized rubber being present in an amount between about 25% and about 75% of the sum of the two rubber ingredients.

7. A cured rubber composition comprising a rubbery butadiene-acrylonitrile copolymer and rubber cyclized in the presence of tin tetrachloride, the cyclized rubber being present in an amount between about 25% and about 75% of the sum of the two rubber ingredients.

8. A cured rubber composition comprising a rubbery butadiene-acrylonitrile copolymer and rubber cyclized in the presence of an hydrated halogen acid of tin, the cyclized rubber being present in an amount between about 25% and about 75% of the sum of the two rubber ingredients.

HERMAN R. THIES.